(No Model.)

C. B. HARNESS.
ELECTRIC BELT.

No. 380,568. Patented Apr. 3, 1888.

Witnesses,
George W. Rea.
Robert Everett.

Inventor,
Cornlius B. Harness.
By James L. Norris.
Atty.

UNITED STATES PATENT OFFICE.

CORNELIUS BENNETT HARNESS, OF LONDON, ENGLAND.

ELECTRIC BELT.

SPECIFICATION forming part of Letters Patent No. 380,568, dated April 3, 1888.

Application filed December 18, 1883. Serial No. 114,954. (No model.) Patented in England October 13, 1883, No. 4,881.

*To all whom it may concern:*

Be it known that I, CORNELIUS BENNETT HARNESS, a subject of the Queen of Great Britain, residing at London, England, have invented an Improved Electrical Belt, chiefly designed for medical purposes, (for which I have obtained protection in Great Britain on the 13th day of October, 1883, No. 4,881,) of which the following is a specification, reference being had to the accompanying drawings.

The present invention relates to that class of devices which are commonly termed "galvanic body-belts," and are designed to be worn for applying electricity for medical curative purposes.

The invention consists in the construction and arrangement of parts, which will be hereinafter more fully described, and then set forth in the claim.

My said invention is illustrated in the accompanying drawings, in which—

Figure 1:
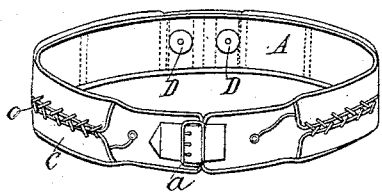
Figure 2:
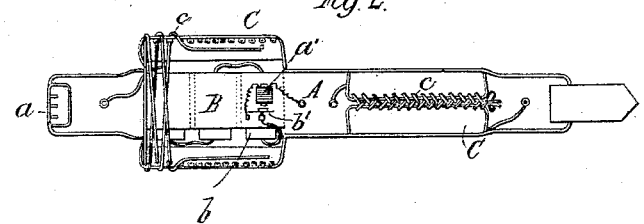
Figure 3:
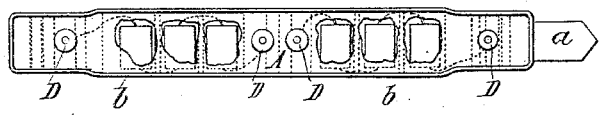

Figure 1 is a perspective view of an electric belt embodying my improvements. Fig. 2 is a view of the outer side of the belt, showing the same open, and a pair of flaps which cover the batteries unlaced. Fig. 3 is a view of the inner side of the belt, portions of the material thereof being cut away to show the position of the batteries.

Similar letters of reference indicate corresponding parts in the several figures.

A indicates the band forming the belt proper, which may be of canvas, wash-leather, or other suitable material, and of any desired width. At the ends of the said band is a buckle, $a$, for uniting the two ends of the belt. If desired, laces or other suitable means may be employed for this purpose.

On the outer side of the band are formed a number of pockets or bags, B, into which the batteries $b$ are to be inserted. The said pockets are preferably lined with some impervious material, to prevent the chemicals with which the battery is charged from penetrating to the surface of the belt.

To the top and bottom edges of the portions of the belt in which the pockets are formed are secured flaps C C, for covering and protecting the batteries. These flaps, as shown in the drawings, are connected and fastened by laces $c$; but buttons or other suitable devices may be used for the purpose.

The batteries are arranged one in each of the said pockets, and may be connected either in parallel or in series to the terminals D D. The said terminals may be knobs, buttons, or pieces of suitable metal and of any convenient size; or I may use terminals, which I render flexible by making them of small pieces of metal jointed or hinged together.

I sometimes find it desirable to cover the terminals with wash-leather. This material becomes slightly moistened by the perspiration of the body of the wearer, and will then permit the passage of the current.

I find it advantageous to arrange the batteries in each half the belt and connect them in series to separate terminals, as shown in Fig. 3, preferably in such a manner that the two terminals of one polarity are at the back of the belt and the two terminals of opposite polarity at the ends of the belt. The batteries may, however, be connected to terminals arranged one at each end of the belt, or each battery may have its own terminals.

The battery which I prefer to employ in connection with the improved belt is that described in the specification of British Letters Patent, dated July 20, A. D. 1882, No. 3,443; but I do not limit myself to the use of this battery, as I may use any metals electrically opposed to one another and any chemical solution as the exciting medium between the said metals.

The battery shown in said English patent is composed of zinc and copper plates separated by bibulous paper saturated with the exciting-fluid.

The batteries may be made either oval, square, cylindrical, or any other convenient shape, as circumstances may require.

Instead of lining the pockets with impervious material, the battery itself may be wrapped in some water-proof material or fastened securely in an india-rubber case.

Instead of using the batteries in the manner hereinbefore described, so that a primary or constant current of electricity is caused to pass through the body, I may connect the conducting-wires to a coil provided with a rheotome, so that an induced current of electricity may be produced. In this case the coil and rheotome would be fastened to the belt.

I am aware that it is not new to provide a body-belt with pockets containing batteries or voltaic elements which are connected with terminal electrodes, and hence I disclaim all broadness of invention.

What I claim is—

An electric body-belt for curative purposes, consisting of the band A, having outer pockets, B, the batteries b, flap C, covering the batteries, a rheotome and induction-coil connected with said batteries, and terminal electrodes for applying the current to the body of the wearer, substantially as described.

In testimony whereof I have hereunto signed my name in the presence of two subscribing witnesses.

CORNELIUS BENNETT HARNESS.

Witnesses:
J. WATT,
WALTER JAMES SKERTEN,
*Both of No. 17 Gracechurch Street, London.*